June 4, 1940.  K. SCHRÖTER ET AL  2,203,619
MOUNTING FOR OSCILLATING MEMBERS
Filed Dec. 6, 1938  2 Sheets-Sheet 2
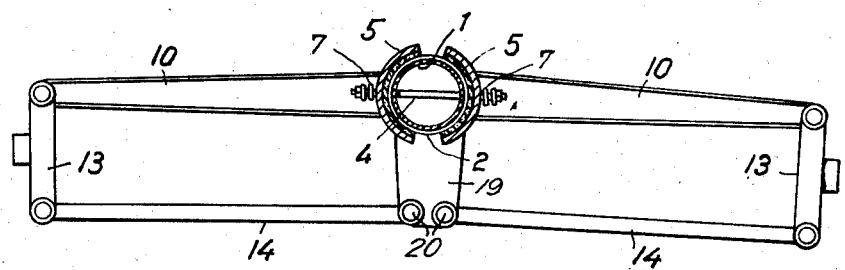
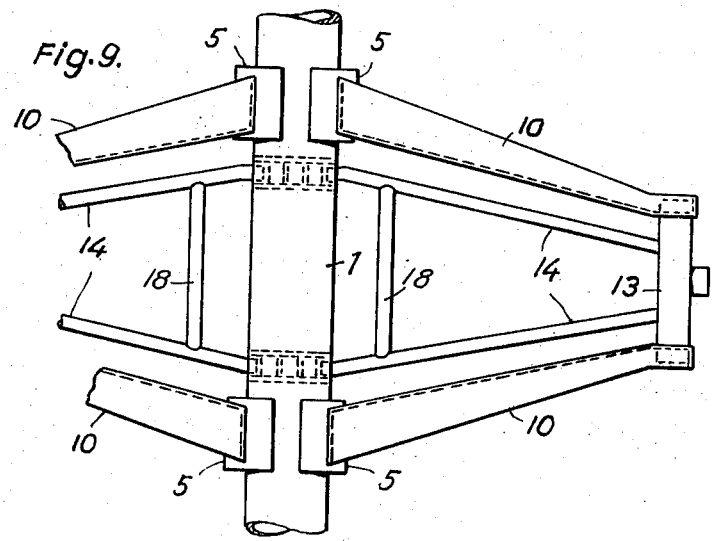
Inventor:
KURT SCHRÖTER
HANS SCHRÖTER
By: Richards & Geier
Attorneys:

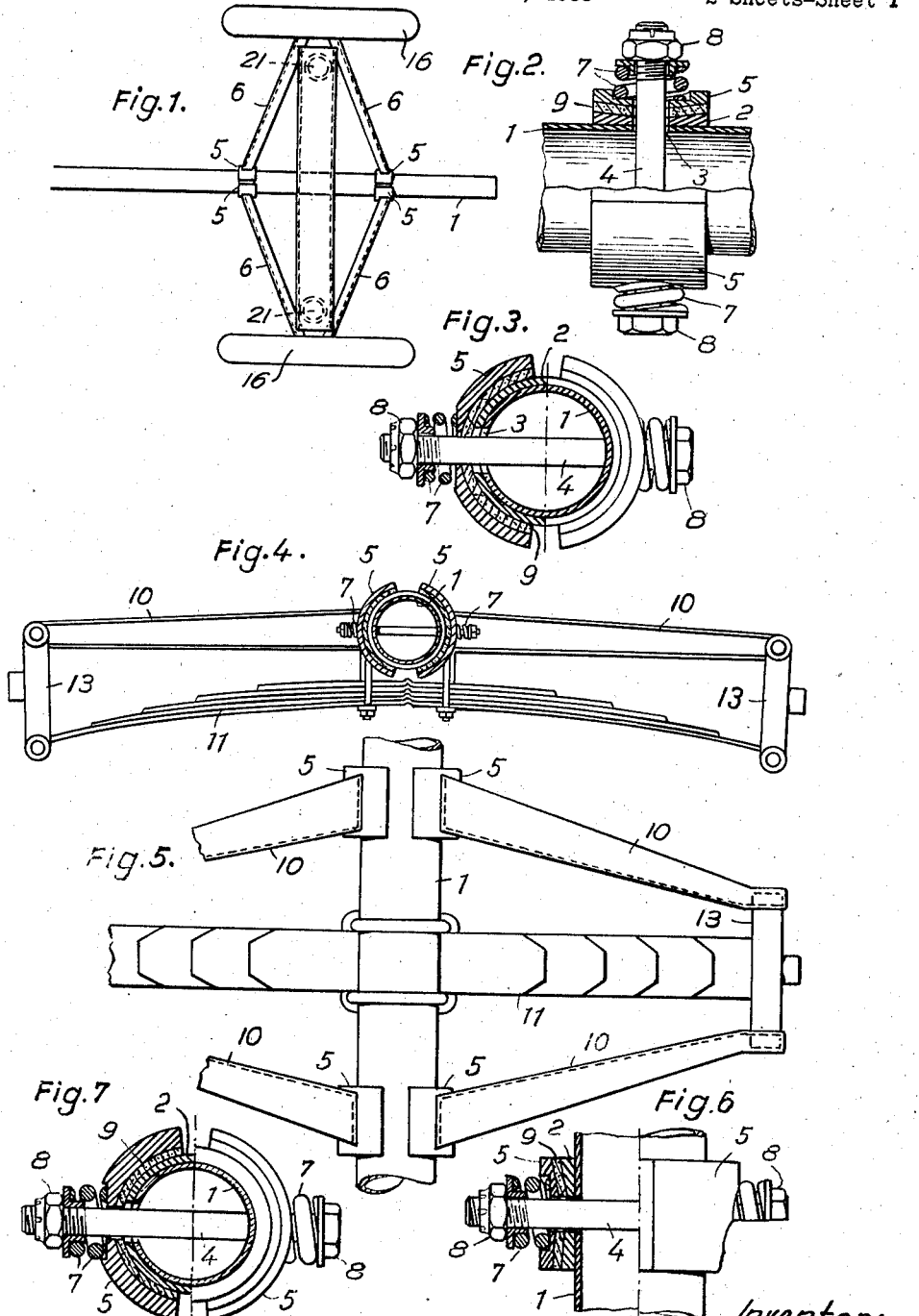

Patented June 4, 1940

2,203,619

UNITED STATES PATENT OFFICE 2,203,619

MOUNTING FOR OSCILLATING MEMBERS

Kurt Schröter and Hans Schröter, Wechmar, Germany

Application December 6, 1938, Serial No. 244,212
In Germany January 23, 1935

15 Claims. (Cl. 267—19)

The present invention relates to an improved method of mounting swinging or oscillating parts on tubular frame members, and is suitable for the mounting of swinging axles and half-axles, rods and the like of motor propelled vehicles.

The usual methods of mounting swinging axles and half-axles of motor propelled vehicles possess considerable disadvantages. The moving parts develop wear and consequently the axles or half-axles are improperly guided during their movements. Improper guiding of the wheels prevents the wheels from following a straight track and excess wear of the tires is thereby caused. The design of the axle mountings is such that considerable lubrication and attention is necessary to keep the mountings in good condition, and no provision is made for automatic compensation for wear.

One object of the present invention is to provide a mounting for the swinging axles or half-axles of motor propelled vehicles which will be of a simple and robust nature such as will require little attention. A further object is to provide a mounting which will not require lubrication. Other objects are to provide a mounting which will afford a considerable measure of damping to the moving parts, and to permit of the easy taking up of wear.

With the above and other objects in view, the invention consists in the novel construction and combination of parts substantially as hereinafter described and more particularly defined in the appended claims, it being understood that such changes in the precise embodiments of the herein disclosed invention may be made as come within the scope of the appended claims.

Several embodiments of the invention, suitable for use on motor propelled vehicles, are illustrated diagrammatically in the accompanying drawings, in which:

Figure 1 is a plan showing relevant parts of a chassis with the mounting applied.

Figure 2 is a plan view, on a larger scale and partly in section, of a mounting.

Figure 3 is a cross-sectional view corresponding to Figure 2, the right hand bearing being shown in side elevation.

Figure 4 is an end elevation and

Figure 5 a plan showing an axle with its mounting, provided with a transversely arranged laminated spring, Figures 6 and 7 being, respectively, a plan and a side elevation, on a larger scale and partly in section, of a mounting.

Figures 8 and 9 are, respectively, an end elevation and a plan, similar to Figures 4 and 5, but provided with transversely arranged rods instead of a laminated spring.

Referring first to Figures 1 to 3, a tubular longitudinal central bearer forming part of the chassis of a motor propelled vehicle is indicated by the numeral 1, and is provided with road wheels 16 carried by swinging half-axles 6. The half-axles 6 are pivotally connected with the bearer 1 and are held by resilient means, such as the helical springs 21. The half-axles 6 are attached to the bearer 1 by means of mountings or bearings 5, the construction of which is more clearly shown in Figures 2 and 3.

A sleeve 2 is mounted on the bearer 1 and two diametrically situated vertical slots 3 are provided in them to receive a bolt 4 which serves to hold in place the bearing-caps 5 attached to the swinging half-axles 6. The inner faces of the caps 5 are provided with a lining 9 of any suitable material such as is used for brake linings. The pressure of the caps 5 on the sleeve 2 is adjusted by a nut 8 and springs 7 on the bolt 4. The outside of the sleeve 2 and the inside of the caps 5 are of double conical form with which the lining 9 conforms, and this permits of the ready taking up of any wear of the lining 9 which ensures that the bearings or mountings 5 constrain the half-axles 6 to oscillate only in vertical planes. Further, the double coned shape of the relatively moving surfaces causes the bolt 4 to maintain a central position in which it will not rub on the sides of the slots 3 in the tubular bearing 1 and sleeve 2.

It will be appreciated that in a bearing or mounting as is above described, there is no metal to metal contact between relatively moving parts, by reason of the provision of the lining 9. The lining material is to a great extent tear and wear resistant, so that lubrication of the moving parts is not necessary to prevent wear.

The nut 8 can be adjusted to vary the clamping pressure of the caps 5 and so vary the damping effects of the mounting upon the oscillations of the half-axles. By arranging the bolts so as to pass through the tubular bearer 1, they are located in a zone in which the springs 7 are subjected to the minimum changes in compression by the oscillations of the half-axles; the clamping pressure of the caps is thereby constant and a constant force is thus maintained to dampen the oscillations. If the bolt were arranged over or under the bearer 1, or even only slightly off its diameter, the compression of the springs 7 would vary and an approximately constant damping effect would not result. By reason of its nature, the lining 9 ensures a considerable degree of damping with a relatively light spring pressure. The double-coned faces of the members 2 and 5 also permit the mounting to take up considerable axial thrusts without need for any special thrust taking devices and this naturally assists in constraining the half-axles to oscillate in vertical planes.

Referring now to Figures 4 to 7, each stub axle 13 for the vehicle wheels, not shown, is pivoted to the ends of a pair of arms 10, the pairs of arms of opposite stub axles being pivoted on the central bearer 1 by means of the mountings or bearings 5. The arms 10 of each pair are preferably splayed outwards from the stub axle to the mountings, as is clearly seen in Figure 5. The two opposite stub axles are also pivoted to the ends of a transverse laminated spring 11, which is rigidly secured to the bearer 1.

Each mounting 5 comprises a sleeve 2 and a pair of caps 5, a lining 9 being interposed between them. A bolt 4, fitted with two coiled springs 7 and a nut 8, and passing through the assembly, clamps the caps onto the sleeve. Vertical slots in the sleeve 2 and bearer 1 accommodate the bolt 4 and permit it to move freely under the oscillations of the arms 10. The mountings constrain the arms to oscillate in a vertical plane and afford an efficient damping of the oscillations.

In Figures 8 and 9, an arrangement is shown which is very similar to that according to Figures 4 to 7, but the stub axles are connected to links instead of to a transverse laminated spring. Each stub axle 13 is pivoted to a pair of arms 10, 10, each of which has a cap 5 forming part of a bearing 5 by which the arm is pivoted to the central longitudinal tubular bearer 1. Each stub axle is also pivoted to a pair of links 14, which are connected by a member 18, the links being pivoted to brackets 19 which are secured to the bearer 1. The links 14 may be sprung by torsion rods 20 or other resilient devices, for example, by torsion springs. Helical springs or other springs may be substituted for leaf springs 11.

In operation, should the half-axles 6 or the arms 10 be caused to oscillate by the passage of their wheels over an uneven road, they can do so about the central bearer 1. The oscillations are, however, dampened effectively by the mountings by which the half-axles and arms are attached to the bearer. Any wear taking place in a mounting is taken up by reason of the double-conical form of its parts and an efficient guiding of the oscillating parts in vertical planes is ensured. By reason of the lining 9, the wear in a mounting is reduced and lubrication and frequent attention are rendered unnecessary.

We claim:

1. A mounting for a member adapted to oscillate about a tubular support, comprising a pair of approximately semicircular caps which embrace said support and one of which is connected to the oscillating member, a bolt and spring means for resiliently holding said caps together, whereby said member is pivotally connected with said support, said bolt passing through elongated holes in the support whereby the bolt can move relatively thereto upon oscillation of said member, and resilient means holding said member relatively to said support.

2. A mounting for a road wheel supporting member of a motor propelled vehicle adapted to oscillate about a tubular bearer forming part of the vehicle chassis, comprising a pair of approximately semi-circular caps which embrace said bearer, one of said caps being secured to a wheel supporting member, a bolt passing through said caps and through diametrically opposite elongated holes in the bearer and having a spring contacting with a cap whereby the caps are drawn together about the bearer about which they can oscillate with the wheel supporting member, whereby said member is pivotally connected with said bearer, and resilient means holding said member relatively to said bearer.

3. A mounting for the road wheel supporting member of a motor propelled vehicle as specified in claim 2, in which each cap of the mounting is connected to the road wheel supporting member.

4. A mounting for a member adapted to oscillate about a tubular support, comprising a pair of approximately semi-circular caps which embrace said support and one of which is connected to the oscillating member, a lining of anti-friction material between the caps and the support, a bolt and spring means for resiliently holding said caps together, whereby said member is pivotally connected with said support, said bolt passing through elongated holes in the support whereby the bolt can move relatively thereto upon oscillation of said member, and resilient means holding said member relatively to said support.

5. A mounting for a road wheel supporting member of a motor propelled vehicle adapted to oscillate about a tubular bearer forming part of the vehicle chassis, comprising a pair of approximately semi-circular caps which embrace said bearer, one of said caps being secured to a wheel supporting member, a lining of anti-friction material between the caps and the bearer, a bolt passing through said caps and through diametrically opposite elongated holes in the bearer and having a spring contacting with a cap, whereby said member is pivotally connected with said support and whereby the caps are drawn together about the bearer about which they can oscillate with the wheel supporting member, and resilient means holding said member relatively to said bearer.

6. A mounting for the road wheel supporting member of a motor propelled vehicle as specified in claim 5, in which each cap of the mounting is connected to a road wheel supporting member.

7. A mounting for a member adapted to oscillate about a tubular support as specified in claim 4, wherein a sleeve is mounted on the support, the anti-friction lining being between the sleeve and the caps, and the bolt passing freely through elongated holes in the sleeve.

8. A mounting for the road wheel supporting members of a motor propelled vehicle as specified in claim 5, including a sleeve on the bearer, the anti-friction lining being between the sleeve and the caps, and the bolt passing freely through elongated holes in the sleeve.

9. A mounting for a member adapted to oscillate about a cylindrical support, comprising a sleeve on said support and having a periphery of double conical form, two approximately semi-circular caps to embrace said sleeve and having inner surfaces of double conical form, one of said caps being secured to the oscillating member, whereby said member is pivotally connected with said support, an anti-friction lining between said sleeve and said caps and conforming to the double conical form of the sleeve and caps, a bolt passing through said caps, spring means for holding said caps together, said bolt passing through elongated holes in the support and sleeve, and resilient means holding said member relatively to said support.

10. A mounting for a road wheel supporting member of a motor propelled vehicle adapted to oscillate about a tubular bearer forming part of the vehicle chassis, comprising a sleeve on said bearer and having a periphery of double conical form, two approximately semi-circular caps to embrace said sleeve and having inner surfaces of double conical form, one of said caps being secured to the wheel supporting member, whereby said member is pivotally connected with said bearer, an anti-friction lining between said sleeve and said caps and conforming to the double conical forms of the sleeves and caps, a bolt passing through said caps, spring means for holding the caps together, said bolt passing through elongated holes in the bearer and sleeve, and resilient means holding said bearer in relation to said supporting member.

11. A mounting for the road wheel supporting member of a motor propelled vehicle as specified in claim 10, in which each cap of the mounting is connected to a road wheel supporting member.

12. A mounting for the wheel supports of a motor propelled vehicle as specified in claim 2, having a stub axle pivotally connected to the free end of the wheel support, and a laminated spring rigidly connected to the bearer and pivotally connected at its outer end to said stub axle.

13. A mounting as specified in claim 2, a wheel support secured to each cap, a stub axle pivotally connected to the free end of each support, and a laminated spring rigidly secured at its centre to the bearer and extending transversely of the vehicle, the free ends of said spring being pivoted to the stub axles.

14. A mounting as specified in claim 2, a wheel support secured to each cap, a stub axle pivotally connected to the free end of each support, a pair of links, resilient means pivotally connecting said links to the bearer, said links extending transversely of the vehicle, each link being pivoted at its outer end to a stub axle.

15. In combination, a supporting member having an outer cylindrical surface, a pair of approximately semi-circular caps which embrace said supporting member, a movable member connected with one of said caps, a bolt and spring device resiliently interconnecting said caps to provide a pivotal connection between said movable member and said supporting member, said bolt extending through openings formed in said supporting member, and wheel-carrying means connected with said movable member.

KURT SCHRÖTER.
HANS SCHRÖTER.